US011961496B2

(12) United States Patent
Lee et al.

(10) Patent No.: US 11,961,496 B2
(45) Date of Patent: Apr. 16, 2024

(54) DRUMHEAD WITH PRINTED LAYER FOR INITIATING FERROUS RESPONSE AND METHOD OF MAKING

(71) Applicant: D'Addario & Company, Inc., Farmingdale, NY (US)

(72) Inventors: Steve Lee, Farmingdale, NY (US); Eric Ricciardi, Brooklyn, NY (US)

(73) Assignee: D'Addario & Company, Inc., Farmingdale, NY (US)

( * ) Notice: Subject to any disclaimer, the term of this patent is extended or adjusted under 35 U.S.C. 154(b) by 74 days.

(21) Appl. No.: 17/719,692

(22) Filed: Apr. 13, 2022

(65) Prior Publication Data

US 2022/0328024 A1 Oct. 13, 2022

Related U.S. Application Data

(60) Provisional application No. 63/174,206, filed on Apr. 13, 2021.

(51) Int. Cl.

| | |
|---|---|
| ***G10D 13/20*** | (2020.01) |
| ***G10D 13/02*** | (2020.01) |
| ***G10D 13/10*** | (2020.01) |
| ***G10D 13/24*** | (2020.01) |
| ***G10H 3/22*** | (2006.01) |

(52) U.S. Cl.

CPC ............. *G10D 13/20* (2020.02); *G10D 13/02* (2013.01); *G10D 13/24* (2020.02); *G10D 13/26* (2020.02); *G10H 3/22* (2013.01); *G10H 2220/461* (2013.01)

(58) Field of Classification Search

CPC ........ G10D 13/20; G10D 13/24; G10D 13/26; G10D 13/02

See application file for complete search history.

(56) References Cited

U.S. PATENT DOCUMENTS 3,509,264 A * 4/1970 Green .................... G10H 3/146 84/DIG. 12
4,242,937 A * 1/1981 Pozar ..................... G10D 13/02 84/DIG. 12

(Continued)

FOREIGN PATENT DOCUMENTS

CN 106531139 A * 3/2017 ............. G10D 13/02
EP 2509066 A1 * 10/2012 ........... G10D 13/024

(Continued)

OTHER PUBLICATIONS

Wei, Yang et al., "Dispenser printed capacitive proximity sensor on fabric for applications in the creative industries," Electronics and Computer Science, University of Southampton, Southampton (2018), retrieved from https://eprints.soton.ac.uk/397121/1/Original%2520Manuscript_Final_Revised.pdf.

*Primary Examiner* — Robert W Horn

(74) *Attorney, Agent, or Firm* — Alix, Yale & Ristas, LLP

(57) ABSTRACT

A drumhead includes a membrane with ferrous responsive material printed onto a surface or otherwise incorporated into it. The ferrous responsive material is detectable by an electromagnetic sensor such that striking the membrane causes vibration that is detected by the sensor, which may initiate an acoustic sound via a sound module. The drumhead may thus be used in an electronic drumming system without requiring fixation of a foreign object to a surface of the membrane.

20 Claims, 12 Drawing Sheets

(56) References Cited

U.S. PATENT DOCUMENTS

| | | | | |
|---|---|---|---|---|
| 4,939,471 | A | 7/1990 | Werrbach | |
| 5,418,458 | A | 5/1995 | Jeffers | |
| 5,936,656 | A | 8/1999 | Yamaguchi | |
| 6,032,779 | A | 3/2000 | McAlister et al. | |
| 6,499,513 | B1 | 12/2002 | Couch | |
| 6,545,466 | B2 | 4/2003 | Sawa et al. | |
| 6,933,430 | B2 * | 8/2005 | Oskorep | G10D 3/173 84/322 |
| 6,986,464 | B2 | 1/2006 | Takiguchi et al. | |
| 7,077,332 | B2 | 7/2006 | Verschuur et al. | |
| 7,267,274 | B2 | 9/2007 | Goetz | |
| 7,657,051 | B1 * | 2/2010 | Kahoe | H04R 1/021 84/723 |
| 8,178,769 | B2 * | 5/2012 | Steele | G10D 13/28 84/421 |
| 8,247,678 | B1 * | 8/2012 | Ivy | G10D 13/02 84/411 A |
| 9,177,537 | B2 * | 11/2015 | Mori | G10H 1/18 |
| 9,536,509 | B2 | 1/2017 | Esparza | |
| 9,672,802 | B2 * | 6/2017 | Muzzio | G10D 13/02 |
| 9,805,703 | B2 | 10/2017 | Esparza | |
| 10,079,008 | B2 * | 9/2018 | Suitor | G10H 3/183 |
| 10,096,309 | B2 * | 10/2018 | Suitor | G10D 13/26 |
| 10,276,140 | B2 * | 4/2019 | Suitor | G10H 3/188 |
| 10,283,101 | B2 * | 5/2019 | Esparza | G10H 3/146 |
| 11,308,928 | B2 * | 4/2022 | Esparza | G01H 11/00 |
| 11,400,517 | B2 * | 8/2022 | Camilleri | B29C 64/245 |
| 2005/0022655 | A1 | 2/2005 | Wise | |
| 2009/0191401 | A1 * | 7/2009 | Deetz | B32B 27/32 428/323 |
| 2011/0192268 | A1 * | 8/2011 | Strickland | G10D 13/02 84/411 M |
| 2012/0236089 | A1 | 9/2012 | Iftime et al. | |
| 2018/0059100 | A1 | 3/2018 | Fattah et al. | |
| 2018/0233118 | A1 * | 8/2018 | Van Den Broeck | G10G 7/02 |
| 2019/0180129 | A1 | 6/2019 | Iwasaki | |
| 2020/0286453 | A1 | 9/2020 | Van Den Broeck | |
| 2022/0328024 | A1 * | 10/2022 | Lee | G10D 13/26 |

FOREIGN PATENT DOCUMENTS

| | | | | |
|---|---|---|---|---|
| EP | 2509066 | A1 | 10/2012 | |
| WO | 9637868 | A1 | 11/1996 | |
| WO | WO-2012122608 | A1 * | 9/2012 | G01L 1/16 |
| WO | 2016005729 | A2 | 1/2016 | |
| WO | WO-2016005729 | A2 * | 1/2016 | G10D 13/024 |
| WO | 2020250165 | A1 | 12/2020 | |

* cited by examiner

DRUMHEAD WITH PRINTED LAYER FOR INITIATING FERROUS RESPONSE AND METHOD OF MAKING

CROSS-REFERENCE TO RELATED APPLICATION

This application claims priority to U.S. Provisional Patent Application No. 63/174,206, filed Apr. 13, 2021, for "Drumhead With Printed Layer for Initiating Ferrous Response and Method of Making," the entire contents of which are incorporated herein by reference.

BACKGROUND

The disclosed embodiments relate to percussion instruments, and more particularly to a drumhead with a ferrous responsive membrane for use in an electronic percussion instrument. The disclosed embodiments additionally concern a method of forming a drumhead with such a ferrous responsive membrane or another electronic musical instrument. In certain embodiments, ferrous responsive material may be an ink printed onto a surface of the instrument.

A standard acoustic drum typically includes a drumhead with a striking membrane tensioned over a hoop. The drumhead is held on a shell by a cylindrical rim engaged over the hoop and secured to a shell by tension rods. An acoustic drum can be struck in a variety of ways to generate different acoustic sounds. For example, a player can strike the drumhead, the rim or the rim and drumhead in combination, each of which produces a different distinct sound. Many additional percussion instruments exist, including cymbals, shakers, tambourines, bells and chimes, for example. Each such instrument generates its own distinctive sound when played, whether via striking, shaking or vibrating.

In more recent years, electronic percussion instruments (typically drums or drumkits) with broad ranges of available sounds have been developed in an attempt to address limitations in standard instruments. Electronic drums include an electronic or digital sound module that produces an acoustic sound and one or more electric sensors for triggering the sound from the sound module. Such electronic instruments typically include a pad or membrane with an attached sensor that generates an electric signal when the pad is struck, which signal is communicated to the sound module to initiate production of an audible sound or tone. Electronic drums can generally produce a wide variety of different tones representative of a range of percussion instruments, such as different types of drums, different types of drum strikes (i.e., membrane vs. rim), and cymbals, for example. Essentially, software can be used to associate a strike of an electronic drum with virtually any audible sound, including non-percussion or even non-musical sounds, via operation of sensors that detect vibration of the drum and communicate signals to a sound module.

An acoustic electronic drum (or drumkit) or hybrid drum includes a regular acoustic drum coupled with an electronic trigger (i.e., communicating sensors) on the drum. These drums can include fixed or removable trigger elements on the drumhead membrane coupled with sensor elements in close proximity that communicate movements of the membrane to trigger electronic sounds.

One example of an electronic drum system is described within International Patent Application Publication No. WO2016/005729. Within this publication is shown a drum with a magnetic element (48) secured to the underside surface of a drumhead membrane (16). An electromagnetic pickup/transducer (i.e., sensor) is fixed to the drum underneath the magnetic element. In use, the sensor detects vibration of the membrane and sends a signal to a sound module to generate an audible tone. This system requires attachment of a foreign object (magnetic element) to the surface of the membrane.

Regardless of the type of electronic drum, the drum operates via sensors detecting vibrations on the membrane or hoop rim and communicating an electric signal to the sound module to generate acoustic sounds. The drumhead can have a mesh membrane, or a standard membrane formed of polymeric materials, such as aramids, mylar or polyester, typically with an electromagnetic transducer/pickup attached directly to a membrane playing surface. An electromagnetic pickup may include a magnet with a core of material wrapped by a coil of an electrically conductive material, such as copper wire, as is widely understood in the art.

While these electronic drumming products are advantageous in many ways, they also carry significant drawbacks. For instance, with acoustic drumheads, musicians strongly disfavor any distinct elements touching the playing surface since they cause unwanted alteration of the natural acoustic sound (damping) and feel as compared to a native membrane. Additionally, repeated attachment and detachment of hardware causes wear and damage to the drum. Still further, electronic drumming systems with add-on hardware are known to be prone to a "double triggering" phenomenon, whereby a single strike results in a sound module generating multiple audible sounds.

It would thus be useful to have an electronic drum that cures these drawbacks associated with known electronic drums that require fixation of a foreign object to a playing surface. It would also be useful to have a unique method of making such electronic drums, drumheads or other instruments.

SUMMARY

In one embodiment, a drumhead includes a membrane and ferrous responsive material integrated within or adhered to the membrane.

In one embodiment, the ferrous responsive material may be a ferrous responsive ink printed on a surface of the membrane.

Ferrous responsive ink may be selected from ferrous inks, carbon-based ferrous nano-inks, non-magnetic mimic inks, 3D printed piezoelectric ink and magnetically induced graphene 3D printing ink.

The membrane may be a polymeric membrane identical or similar to a standard acoustic drum membrane, which may be formed from aramids, mylar or polyester.

The membrane may also be a porous material similar or identical to a membrane for use in a reduced-volume drum, such as a mesh.

When incorporated into an electronic drumming system with an electromagnetic sensor, the electromagnetic sensor detects vibration of the drum membrane via the ferrous responsive material upon a strike of the drumhead and may send a signal to a sound module, which in turn generates an acoustic output.

In another embodiment, a method of forming a drumhead includes the steps of providing a membrane that defines a first surface and an opposite second surface; and then printing a graphic on one or both of the first surface and second surface of the membrane. The graphic is printed with ferrous responsive ink.

In yet another embodiment, an electronic drumming assembly includes a drumhead, an electromagnetic sensor element and a sound module. The drumhead comprises a ferrous responsive material integrated into the membrane. The electromagnetic sensor element is positioned spaced from the ferrous responsive material and configured to sense vibrations of the membrane. A communication pathway communicatively connects the electromagnetic sensor element to the sound module. The sound module is configured to generate an acoustic sound in response to an input signal from the electromagnetic sensor element. When the membrane is struck, the electromagnetic sensor element senses vibration of the membrane and sends a signal to the sound module which thereby generates an acoustic sound associated with the drumhead.

DISCLOSURE OF TH INVENTION

Among the benefits and improvements disclosed herein, other objects and advantages of the disclosed embodiments will become apparent from the following wherein like numerals represent like parts throughout the figures. Detailed embodiments of a drumhead with printed ferrous responsive layer or incorporated ferrous responsive material and a method of making, are disclosed; however, it is to be understood that the disclosed embodiments are merely illustrative of the invention that may be embodied in various forms. In addition, each of the examples given in connection with the various embodiments of the invention are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), although it may. The phrases "in another embodiment" and "in some other embodiments" as used herein do not necessarily refer to a different embodiment, although it may. Thus, as described below, various embodiments may be readily combined without departing from the scope or spirit of the invention.

In addition, as used herein, the term "or" is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 1:
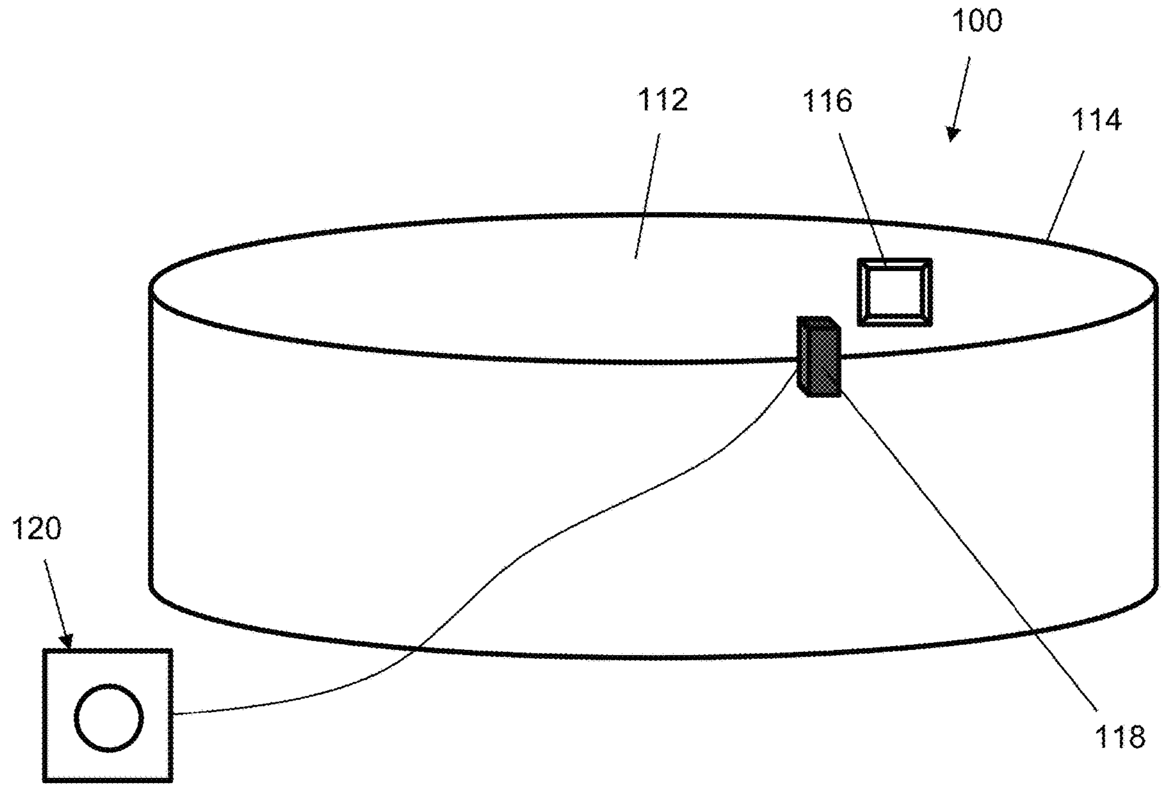
Figure 1 (Prior Art)
FIG. 1 shows an exemplary prior art electronic drum with magnetic element attached to the surface of the membrane.
Figure 2:
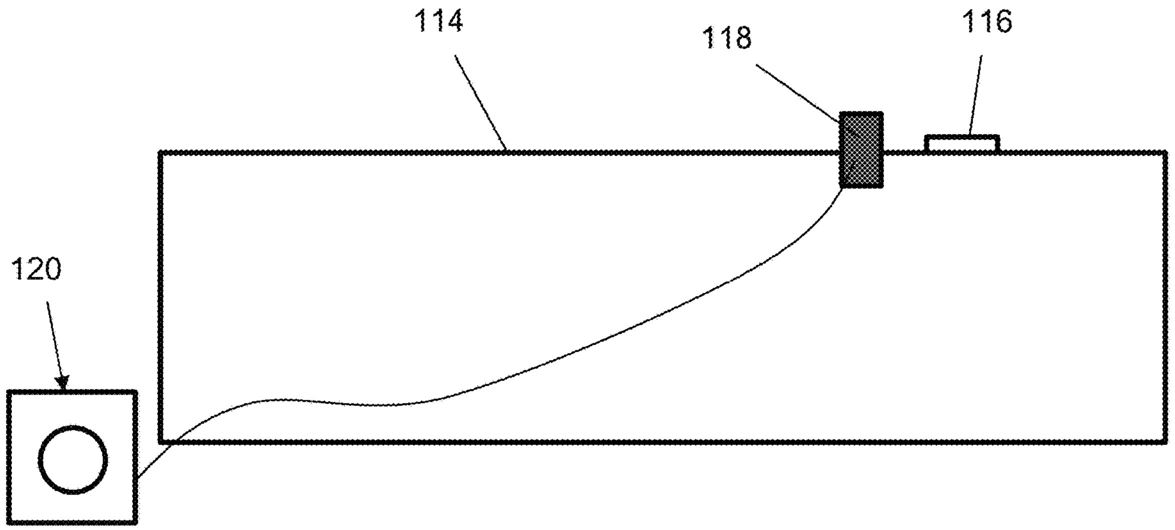
Figure 2 (Prior Art)
FIG. 2 shows a side elevation view of the electronic drum of FIG. 1.

FIGS. 1 and 2 show a representative prior art electronic drum 100 with a metallic or magnetic element 116 secured to the top surface of the membrane 112. An electromagnetic sensor 118 is attached to the rim 114 in this particular embodiment. When the sensor 118 detects membrane vibration from the magnetic element 116, typically from a user striking the drum, it communicates signals to a sound module 120 to initiate a sound. As noted above, there are many prior art electronic drums and drum kits that utilize these general elements and characteristics of a distinct magnetic element attached to a drum membrane, in albeit various specific configurations.

Figure 3:
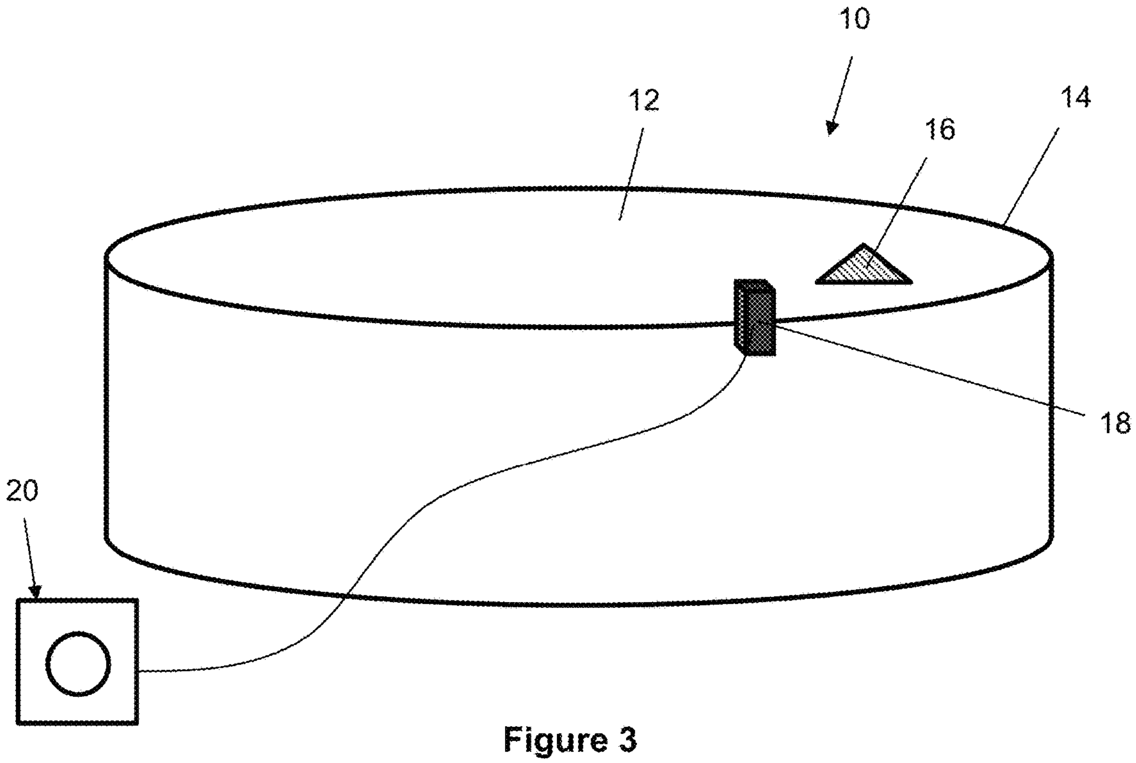
FIG. 3 shows an embodiment of an electronic drum with the disclosed drumhead having ferrous responsive material incorporated into the membrane.
Figure 4:
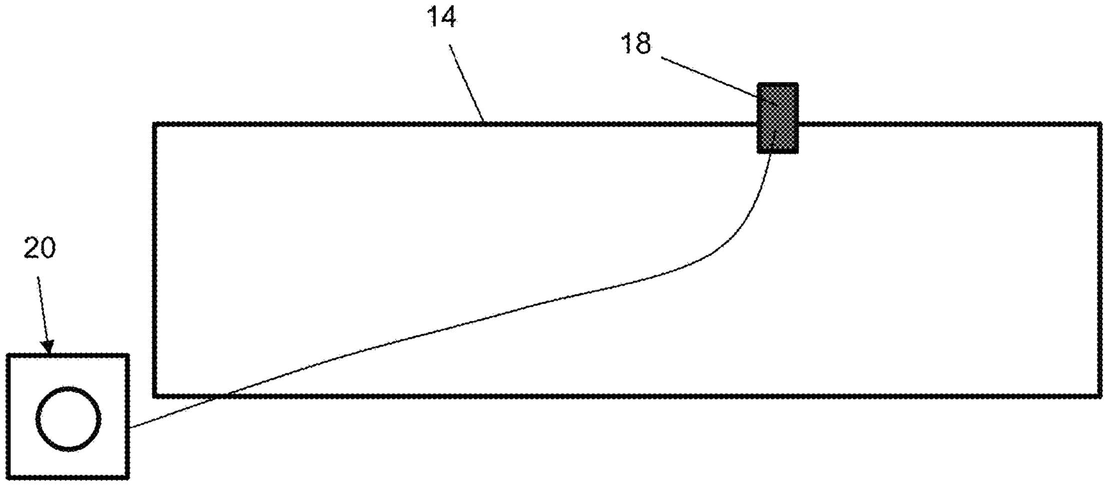
FIG. 4 shows a side elevation view of the electronic drum of FIG. 3.

With reference to FIGS. 3-7P, which show inventive embodiments, disclosed herein is a drumhead 10 comprising a membrane 12 with ferrous responsive material 16 integrated into the membrane material or printed onto the membrane so as to fuse to or otherwise become integral with the membrane. In one preferred embodiment, the membrane 12 is printed with a ferrous responsive ink or a composition that includes ferrous responsive ink. The depiction of FIGS. 3 and 4 show the drumhead stretched across a hoop and incorporated into a drum. Here, the drumheads can be played as acoustic drumheads, if desired, or when used with an electromagnetic sensor 18, can function as an electronic drum without any alteration of the drumhead or membrane, or attachment of a distinct element to the membrane surface whatsoever.

Figure 5:
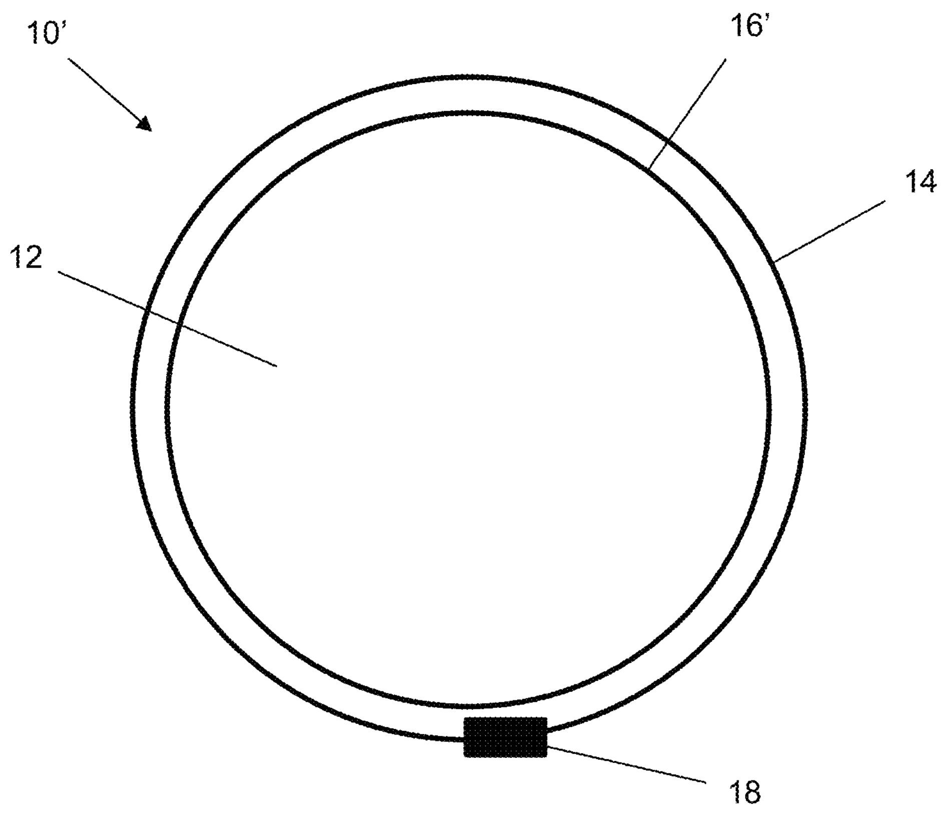
FIG. 5 shows another embodiment of the disclosed electronic drum.
Figure 6A:
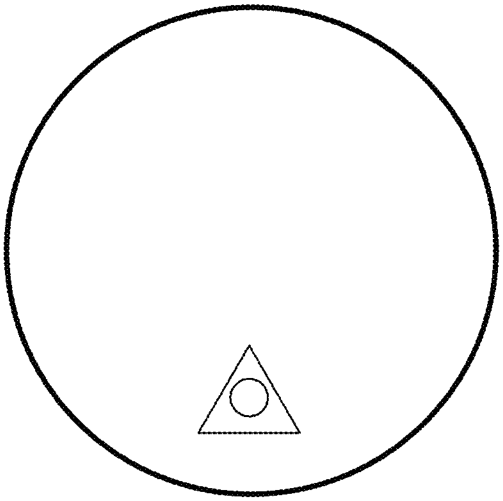
FIGS. 6A-6D show exemplary membranes with different graphics applied or printed with ferrous responsive ink.
Figure 6B:
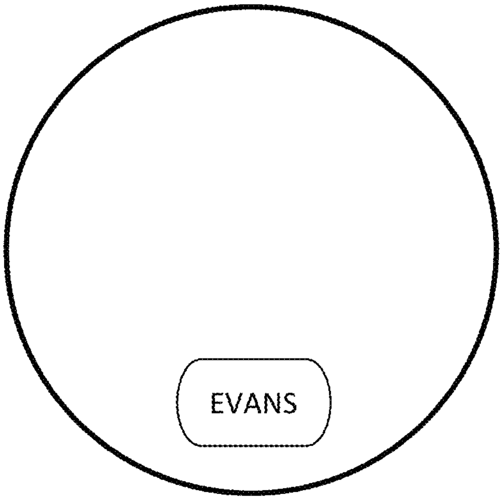
Figure 6C:
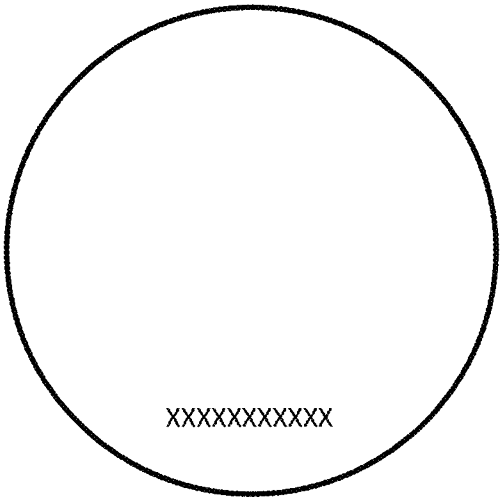
Figure 6D:
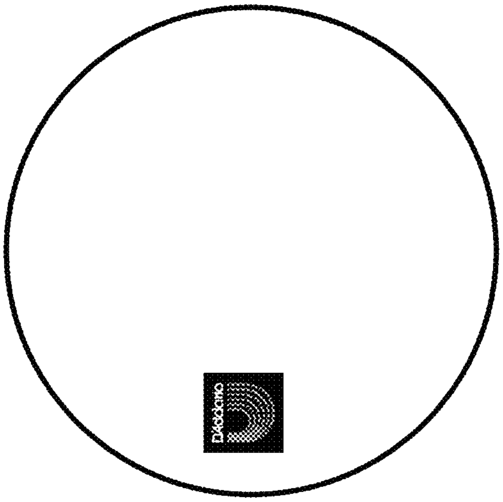

FIG. 5 shows an additional embodiment of a drumhead 10' according to the disclosure. This embodiment is substantially similar to the drum depicted in FIGS. 3-4, including a membrane 12 stretched across a hoop 14 that may be attached to a drum with an electromagnetic sensor 18 secured to the rim. In this embodiment, the membrane 12 includes ferrous responsive material in the shape of a ring 16'. The ring 16 is coaxial to the hoop and membrane 12 and is preferably printed with a ferrous responsive ink. Preferably, such a ring 16' is positioned toward the outer edge of the membrane 12 inside of the hoop 14.

Figure 7A:
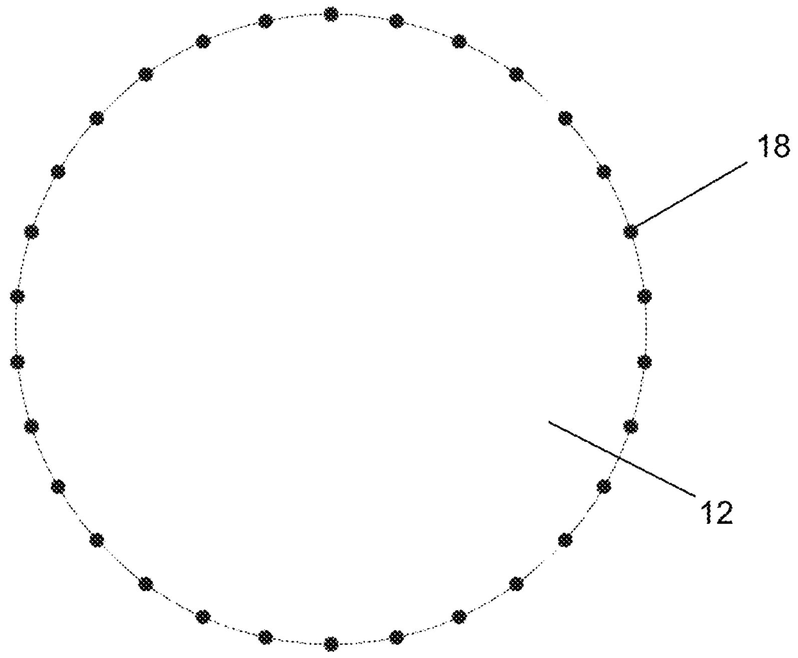
FIGS. 7A-7P show additional exemplary printed patterns on membranes for use in the disclosed drumheads.
Figure 7B:
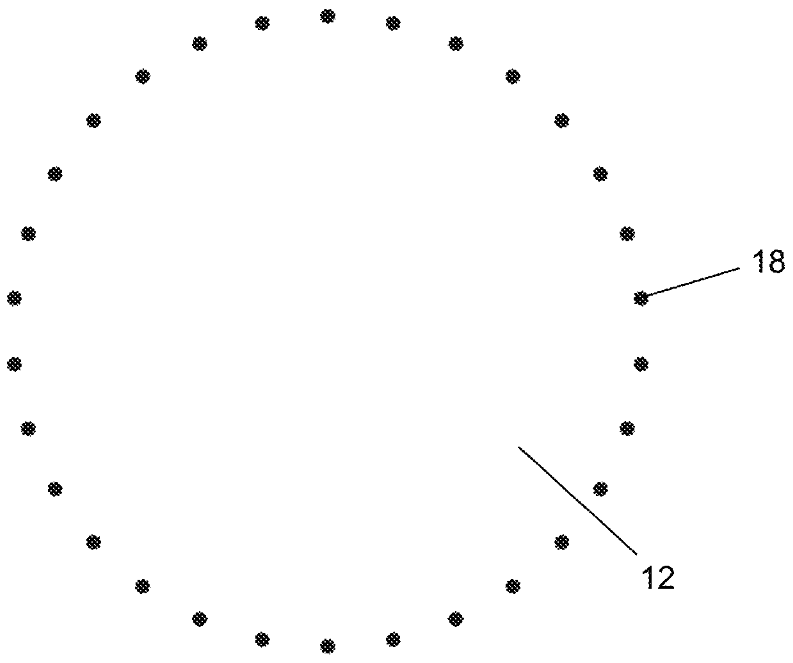
Figure 7C:
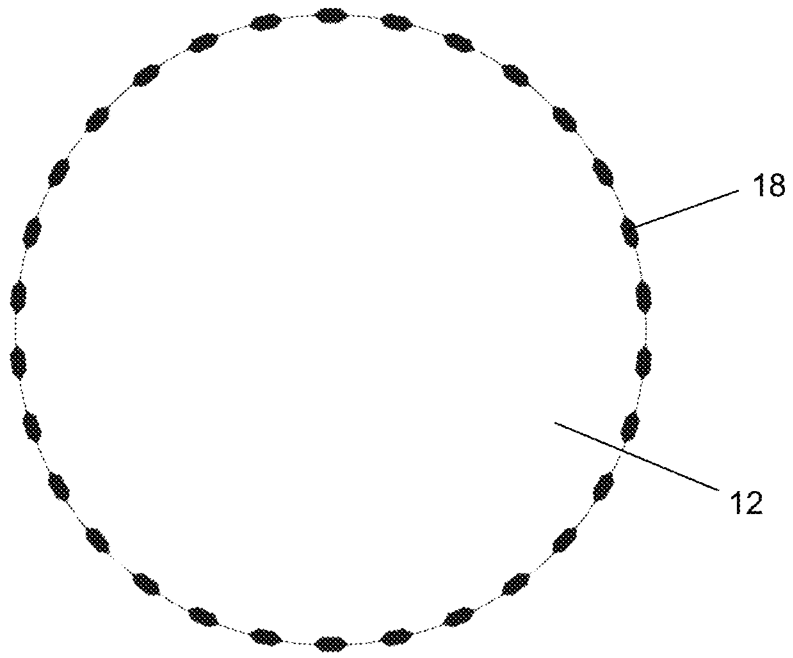
Figure 7D:
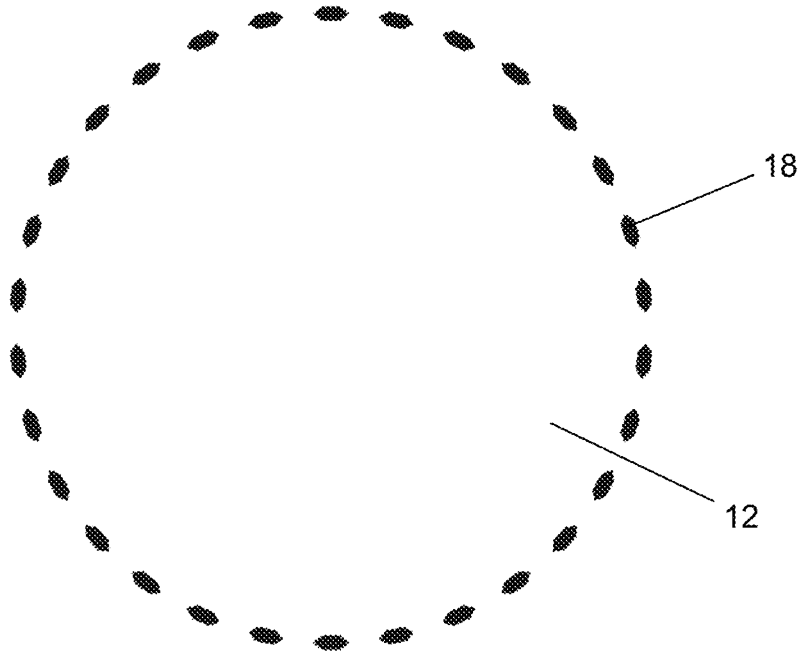
Figure 7E:
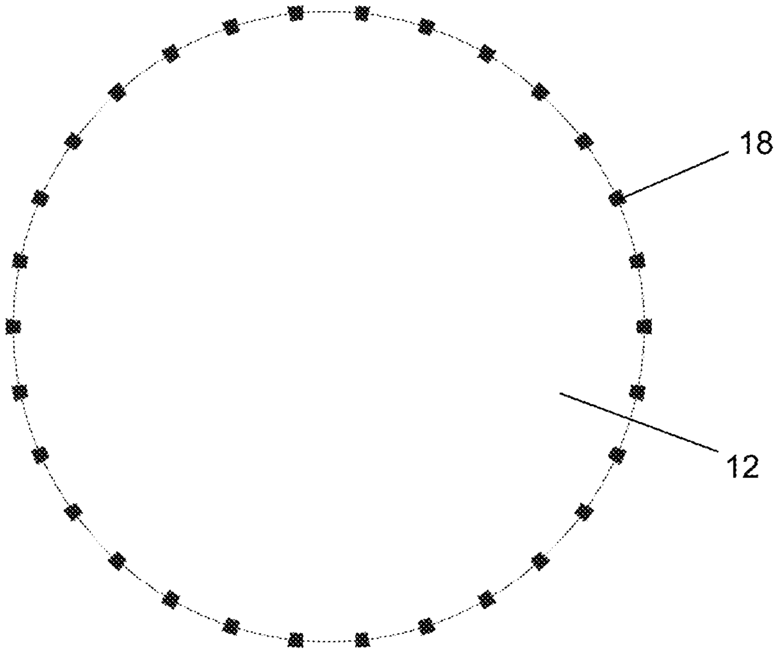
Figure 7F:
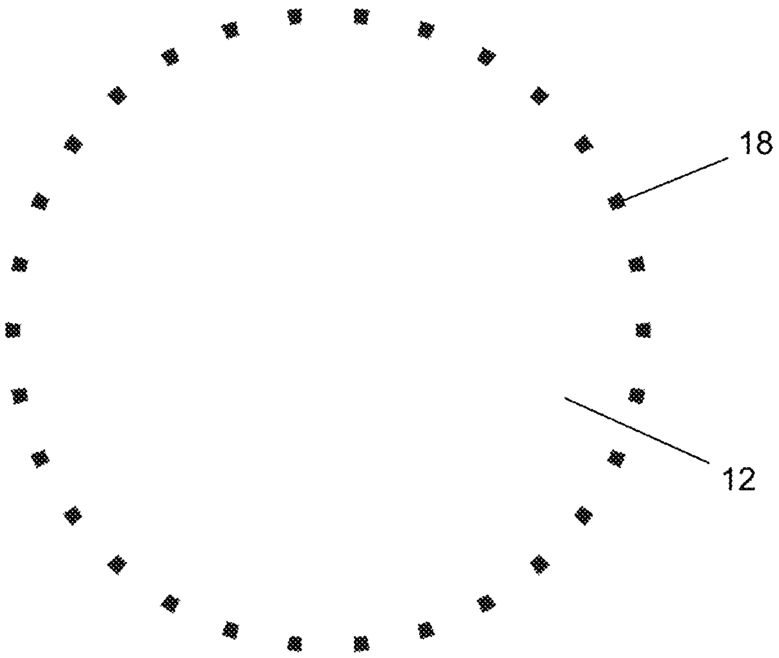
Figure 7G:
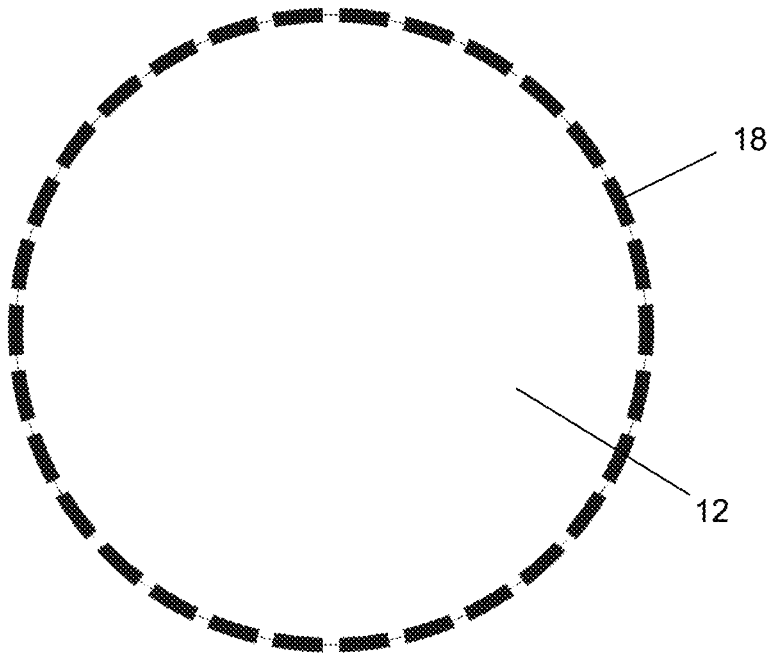
Figure 7H:
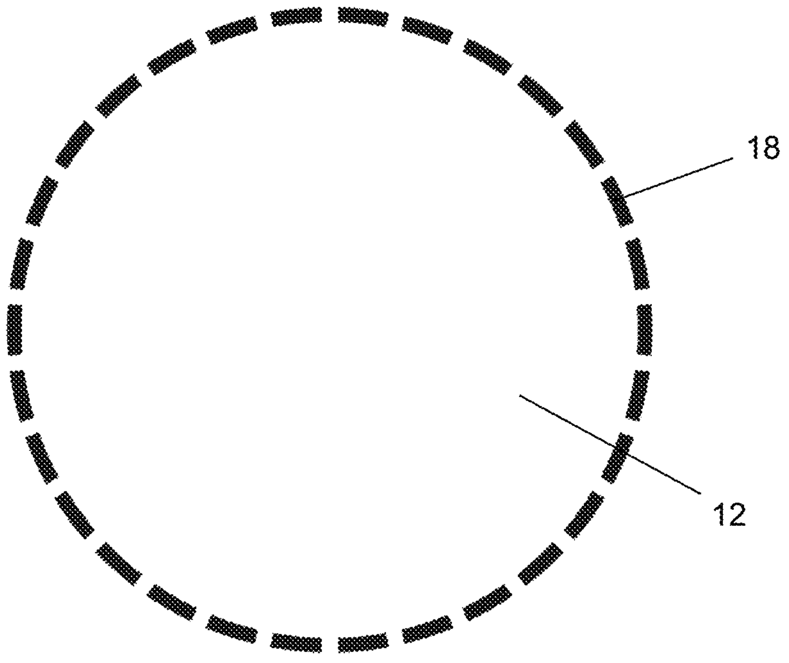
Figure 7I:
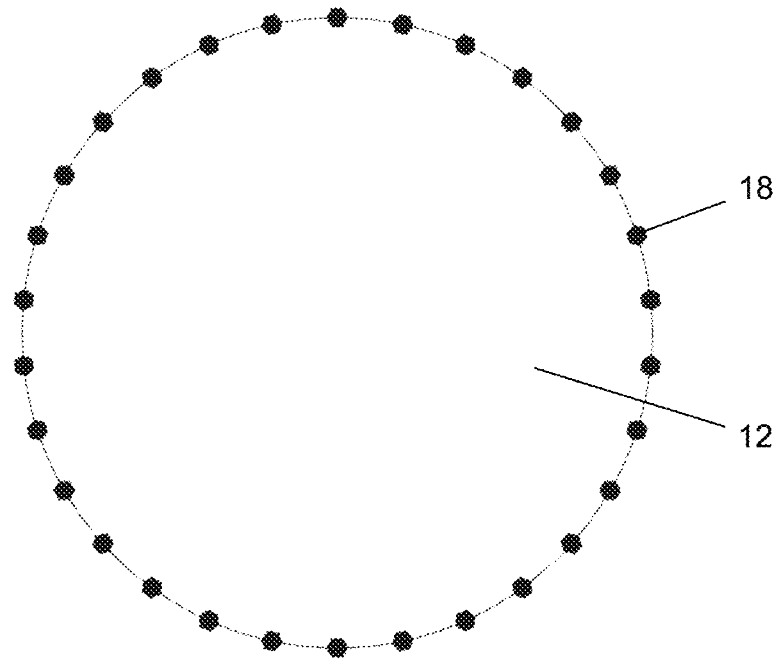
Figure 7J:
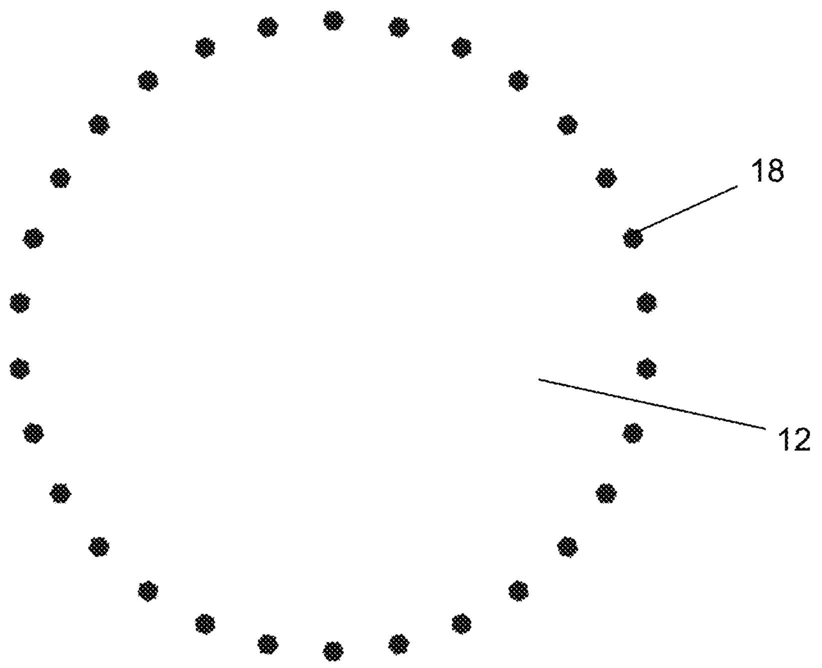
Figure 7K:
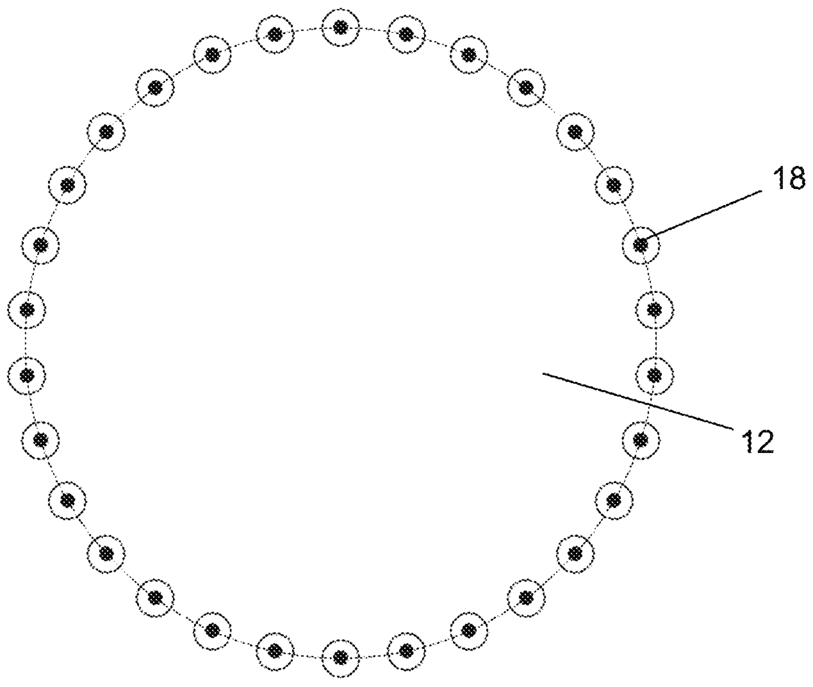
Figure 7L:
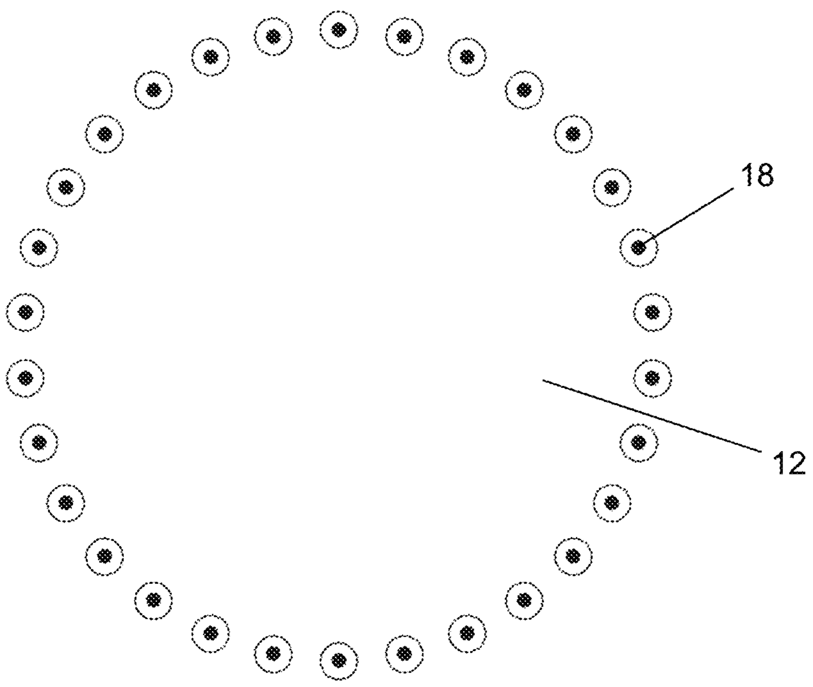
Figure 7M:
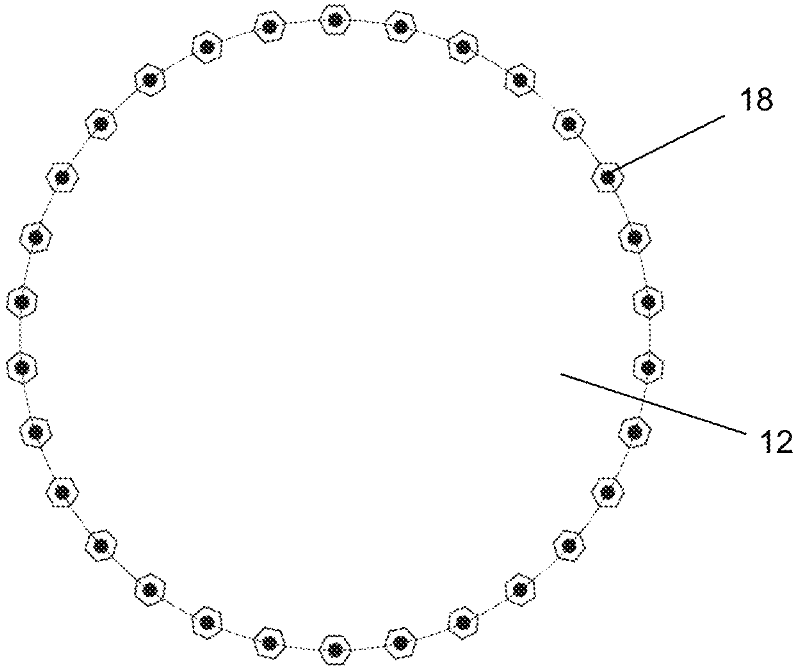
Figure 7N:
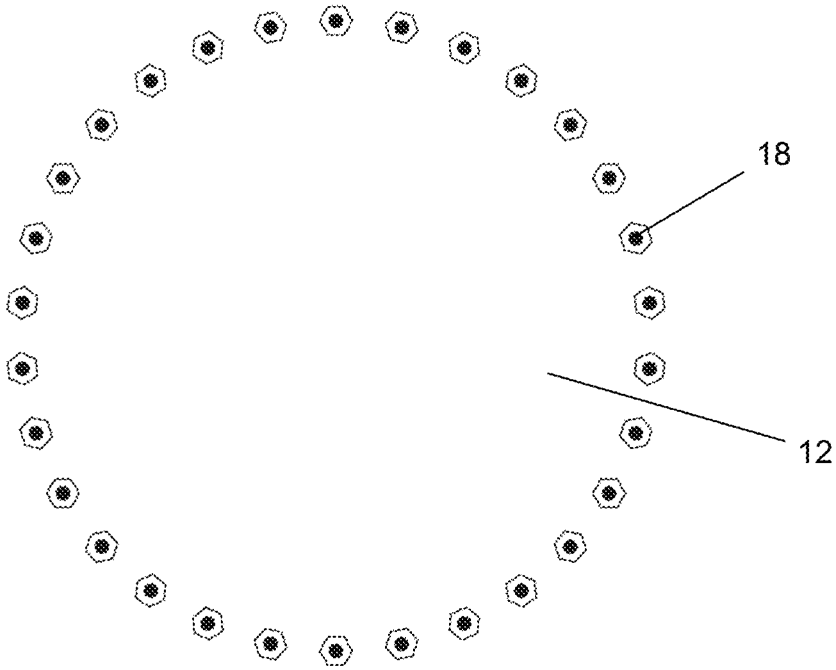
Figure 7O:
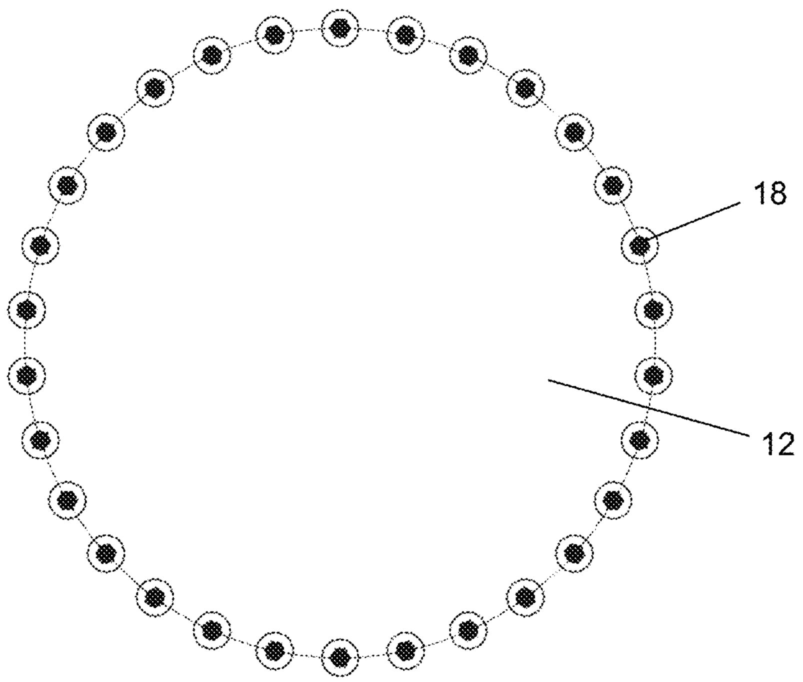
Figure 7P:
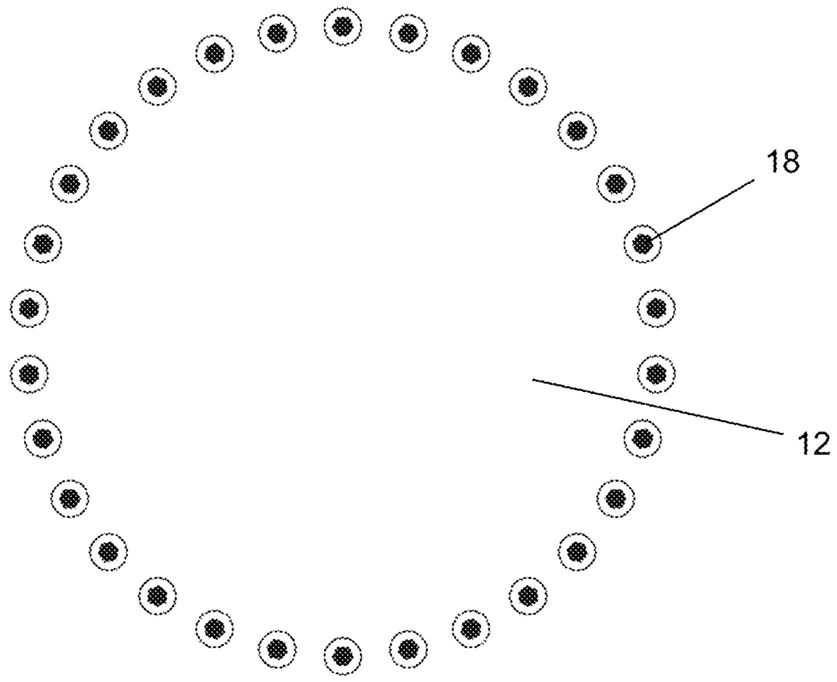

Additional ring-like patterns are shown in FIGS. 7A-7P, which depict additional exemplary patterns of printed ferrous responsive formulations. These formulations include one or more ferrous responsive inks and optionally include additional components such as texturizing agents. As can be seen, the printed patterns in these embodiments combine to form a substantially circular shape. Also as shown, the patterns may include distinct spaced apart dots or shapes and may be printed with tracings between adjacent spots (i.e., FIG. 7A, 7C, 7E, 7G, 7I, 7K, 7M, 7O) or with spots spaced from one another in a generally circular pattern (i.e., FIG. 7B, 7D, 7F, 7H, 7J, 7L, 7N, 7P). The circular patterns have been shown to be advantageous in that they provide an even distribution of ferrous responsive material, thus providing uniform feedback during use.

The term "ferrous responsive," as used herein to describe materials and inks, means a class of inks that elicit a response like a magnetic ink when passed through a magnetic field, including inks that are not necessarily inherently magnetic themselves and may not actually contain ferrous particles. Such ferrous responsive inks suitable for use in making the disclosed drumheads include, without limitation, ferrous inks, carbon-based ferrous nano-inks, non-magnetic mimic inks (inks that trigger signal response without being magnetic), 3D printed piezoelectric ink and magnetically induced graphene 3D printing ink.

EXAMPLES

Numerous compositions of available ferrous responsive inks and texturizing agents 18 were printed on a membrane, like that shown generally as reference numeral 12, in generally circular patterns, like those shown in FIGS. 7A-7P. The exemplary membranes with printed circular patterns were thereafter formed into drumheads by stretching each membrane across a circular hoop with the respective printed pattern on the topside of the membrane substantially coaxial to the drumhead. As noted, the circular printed pattern advantageously provides numerous pickup placements around the circumference of the drumhead. When an electromagnetic sensor is in place relative to the drumhead, the drumhead is struck, which causes the printed ferrous responsive ink to move through the magnetic field, thereby producing a desired signal strength for pickup by the sensor. The exemplary manufactured drumheads printed with ferrous responsive ink provided triggering results comparable to commercial electronic drum systems that utilize a distinct magnetic element affixed to the membrane surface, like that shown in FIGS. 1 and 2.

Importantly, the ink formulation, quantity and/or print pattern can be adjusted or "tuned" to elicit different desired signal strengths for use with different pickup systems. The exemplary embodiments include: (a) a ferrous responsive ink, (b) an adhesion promotor, (c) optionally iron particles, and (d) optionally a texturizer. In such embodiments, iron particles may be added to the composition to elicit a stronger signal response. Understandably, in such embodiments, concentration of iron particles may be adjusted to reach a desired strength of the signal response. Similarly, a texturizer can be added at various concentrations to alter thicknesses of the deposition of ink composition on the membrane, which also results in different signal strength when the drumhead is struck.

TABLE 1

| Examples | | | | |
|---|---|---|---|---|
| | Formulation (weight %) | | | |
| Example | Ink | AP | Fe | Texturizer |
| 1 | 84 | 16 | — | — |
| 2 | 74 | 16 | 10 | — |
| 3 | 64 | 16 | 20 | — |
| 4 | 54 | 16 | 30 | — |
| 5 | 44 | 16 | 40 | — |
| 6 | 34 | 16 | 50 | — |
| 7 | 52 | 16 | 30 | 2 |
| 8 | 50 | 16 | 30 | 4 |

Ink: Nazdar NFX56 UV Magnetic Responsive Ink
AP: adhesion promotor, Nazdar NB801L
Fe: iron particles, Iron Atlantic Equipment Engineers Hydrogen Reduced Iron Metal Powder
Texturizer: Cabosil Nazdar SIPI414 Cabosil PTG As noted above, the exemplary compositions of ink, adhesion promotor, optional iron and optional texturizer were printed in a generally circular pattern on a porous membrane. The printed compositions were cured via exposure to UV light (300 watts UV light intensity on a running belt at 64 feet per minute, resulting in 250 millijoules exposure). Preferably, both sides of the porous membrane are exposed to the UV waves in this manner to ensure complete curing of the printed composition. The cured printed membranes were each formed into drumheads and tested with commercially available electromagnetic sensor hardware. All examples shown in Table 1 elicited a signal response when struck. Of the Examples without texturizer, Example 1 generated the weakest signal and Example 6 generated the strongest signal. Understandably, signal strength increases as concentration of iron particles present in the formulation increases. In the testing, it was found that Example 4, with 30% iron particles by weight, produced a preferred signal strength for optimal detection by the given hardware.

Further, addition of the texturizer yielded a thicker printed section on the drumhead when cured, which thereby generated a slightly stronger signal when struck compared to a drumhead printed with the same concentration of components without the texturizer (Examples 6 and 7 compared to Example 4). Greater concentration of texturizer in the composition yields thicker cured printed material, and thus increases signal strength generated by the exemplary drumhead when struck (Example 7 generates stronger signal strength than Example 6). One of skill can readily understand that the preferred signal strength can vary depending on the setting and hardware used. The above Examples 1-8 show the efficacy and adjustability of the disclosed inventive printing techniques and printed drumheads.

Those skilled in the art would readily understand that the inventive methods and drumheads are not limited to the exact components of the Examples. Rather, Examples 1-8 are merely prophetic of the efficacy of the disclosed ferrous responsive printed drumheads and manufacturing method. The techniques are also applicable to other instruments or portions of instruments that can be struck to elicit detectable vibrations, such as a cymbal or portion of a drum other than the drumhead.

One additional advantage of the disclosed drumhead and manufacturing method is that the membranes can be printed with such inks to form a desired graphic or text on a membrane surface. For example, the surface of a drumhead membrane can be printed with ferrous responsive ink to form a company logo, or other trademark or distinctive graphic, as is commonly done in the industry with non-ferrous responsive ink. This ultimately yields a drumhead that looks identical or substantially identical to existing acoustic drumheads and sounds like a standard drumhead when played acoustically, but which is optionally usable in an electronic drum system without attachment of any object to the membrane due to the presence of the ferrous responsive material.

Moreover, as suggested with reference to FIGS. 5A-5D and FIGS. 7A-7P, a virtually endless variety of graphics, patters and/or text can be applied to membranes 12. In this manner, the appearance of the resulting drumhead can be chosen so as not to differ substantially from other drumheads in a company's product portfolio. The resulting drumhead sounds identical to its "regular" acoustic contemporary when not paired with an electromagnetic sensor 18 for electronic use.

In one embodiment, shapes, size, thickness and density of the ferrous responsive printed layer 16 can be adjusted specifically to adjust signal strength generated upon striking the membrane. The associated electronic drumming system can be programed to cause the electromagnetic sensor 18 to generate a different signal to a communication unit or sound module 20 in accordance with different properties of the layer of ferrous responsive material 16. In this manner, a wide variety of types of drums or other instruments can be provided wherein each type is printed with a distinct graphic or pattern and/or with printed material having a distinct density that is associated with a particular drum type. It follows that the electronic drumming system (sensor, software and sound module) can associate the particular density or graphic with a distinct sound.

The graphics printed with ferrous responsive ink may be applied to the membrane using common technologies, such as dye sublimation, screen printing or inkjet printing techniques. Additionally, as noted above, the inventive drumheads may be incorporated into standard acoustic drums, like those shown in FIGS. 3 and 4, and optionally played like acoustic drums. The drumheads may additionally be treated in manners known in the art to adjust acoustic properties, including application of coatings, other printed layers (independent of a printed layer of ferrous responsive material) and/or heat treatment.

In other embodiments, drumheads with printed or integrated ferrous material may be formed of a porous fabric layer of material (such as a mesh), rather than polymeric film materials (such as aramids, mylar, polyester, for example). The porous layer may be formed of monofilament or multifilament materials in woven, twisted, knotted, knit and/or braided configurations to form a porous mesh fabric. Additionally, the porous layer is not limited in terms of a specific orientation of fibers. Embodiments may include multiple layers of porous material and/or film, or may include an integral layer formed as a composite between two or more different individual materials or fibers. Exemplary materials for forming the mesh layer include KEVLAR® brand and related aramid synthetic fibers and PEEK. In such embodiments, the drumheads may be incorporated into practice pads or reduced-volume drums with optional functionality as electronic drums when engaged with an operative sensor.

Additionally, the inventive drumheads can be used in electronic drumming systems with a variety of different sensor or pickup elements provided in proximity to the ferrous responsive portion 16 of the membrane so as to be able to sense vibration. That is to say that the depicted embodiments with a sensor 18 attached to the rim of the drum are non-limiting.

Still further, the technology described herein for forming the inventive drumheads can be used on other instruments or portions of a drum to provide additional electronic instruments. For example, snare wires exist with ferrous material incorporated therein or a layer of ferrous responsive ink. Ferrous responsive ink can be incorporated into the rim of a drum, hoop of a drumhead, shell of a drum and cymbals, for example. Thus, when used with an electromagnetic sensor and electronic sound generating equipment, as described herein, these additional instruments elicit a similar response when struck.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. An electronic percussion instrument, comprising:

a drumhead membrane stretched across a substantially circular hoop and defining a surface with a circumference; and a layer of ferrous responsive material permanently cured to the surface about the circumference thereof in a ring-like pattern, wherein the ferrous responsive material is non-magnetic.

2. The instrument of claim 1, wherein the ferrous responsive material is permanently cured in a distinct graphic or text display on the membrane surface.

3. The instrument of claim 1, wherein the membrane is formed from a polyester, an aramid, mylar or a combination thereof.

4. The instrument of claim 1, wherein the membrane is formed from a porous mesh material.

5. The instrument of claim 1, wherein the ferrous responsive material is printed about the drumhead in a substantially coaxial to the hoop.

6. A method of forming a drumhead, comprising:

providing a membrane defining a first surface and an opposite second surface;

applying a graphic on one or both of the first surface and second surface of the membrane with a curable ferrous responsive material; and exposing one or both of the first surface and second surface of the membrane to conditions to cure the ferrous responsive material to the one or both of the first surface and second surface, wherein the ferrous responsive material is non-magnetic.

7. The electronic percussion instrument of claim 1, wherein the layer of ferrous responsive material takes the form of spots spaced from one another in a generally circular pattern about the circumference of the surface.

8. The method of claim 6, wherein a density of the ferrous responsive ink can be adjusted to adjust strength of a signal communicated to an electromagnetic sensor positioned in proximity to the membrane.

9. The method of claim 6, wherein the ferrous responsive material is UV-curable and the step of exposing includes exposing one or both of the first surface and second surface to UV waves.

10. The method of claim 9, wherein both of the first surface and second surface of the membrane is exposed to UV waves.

11. The method of claim 10, wherein one or both of the first surface and second surface of the membrane is exposed to UV waves at approximately 300 watts on a running belt.

12. An electronic drumming assembly, comprising:

a drumhead having a membrane stretched across a substantially circular hoop and defining a top surface and bottom surface; and a layer of ferrous responsive material permanently cured to one or both of the top surface and bottom surface of the membrane, the layer forming a substantially ring-like pattern coaxial to the drumhead;

an electromagnetic sensor element positioned spaced from the ferrous responsive material and configured to sense vibrations of the membrane via the ferrous responsive material; and a communication pathway communicatively connecting the electromagnetic sensor element to a sound module configured to generate an acoustic sound in response to an input signal from the electromagnetic sensor element, wherein when the membrane is struck, the electromagnetic sensor element senses movement of the membrane and sends a signal to the sound module which thereby generates an acoustic sound associated with the drumhead, and the layer of ferrous responsive material is non-magnetic.

13. The electronic drumming assembly of claim 12, wherein the layer of ferrous responsive material includes a portion permanently cured to one or both of the top surface and bottom surface of the membrane in a distinct graphic or readable text display.

14. The electronic drumming assembly of claim 12, wherein the membrane is suitable for use in an acoustic drum without interaction with an electromagnetic sensor or sound module.

15. The electronic drumming assembly of claim 14, wherein the membrane is formed from a polyester, an aramid, mylar or a combination thereof.

16. The electronic drumming assembly of claim 12, wherein the membrane is formed from a porous mesh material.

17. The electronic drumming assembly of claim 12, wherein the sensor element is removably secured to an outer portion of the drumhead.

18. The electronic drumming assembly of claim 17, wherein the sensor element is removable from a first position and re-attachable to the outer portion of the drumhead at a different second position without altering a position of the layer of ferrous responsive material without impacting the sensing of vibrations of the membrane.

19. The electronic drumming assembly of claim 12, wherein the layer of ferrous responsive material is UV-cured.

20. The electronic drumming assembly of claim 12, wherein the layer of ferrous responsive material takes the form of spots spaced from one another in a generally circular pattern about the circumference of the surface.

* * * * *